A. M. KNUDSEN.
COMBINED CHURN AND BUTTER WORKER.
APPLICATION FILED JULY 10, 1913.

1,106,460.

Patented Aug. 11, 1914.
2 SHEETS—SHEET 1.

Witnesses

Inventor
Anders M. Knudsen,
By
his Attorney

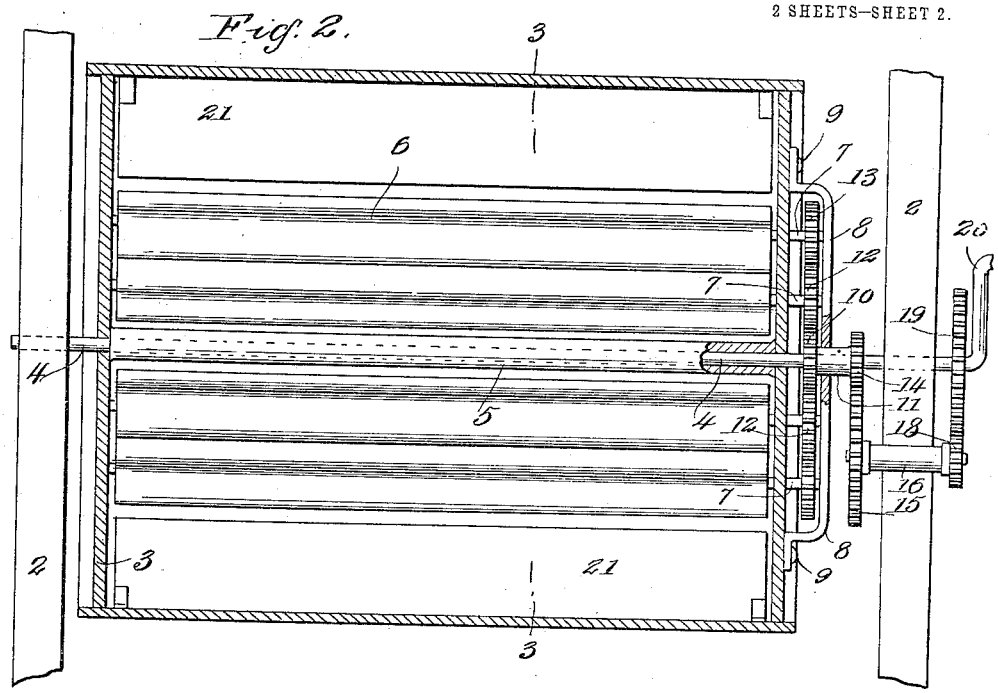

UNITED STATES PATENT OFFICE.

ANDERS M. KNUDSEN, OF WEST BRANCH, IOWA.

COMBINED CHURN AND BUTTER-WORKER.

1,106,460. Specification of Letters Patent. Patented Aug. 11, 1914.

Application filed July 10, 1913. Serial No. 778,364.

*To all whom it may concern:*

Be it known that I, ANDERS M. KNUDSEN, a citizen of Jutland, Denmark, residing at West Branch, in the county of Cedar and State of Iowa, have invented certain new and useful Improvements in Combined Churns and Butter-Workers, of which the following is a specification.

This invention relates to improvements in combined churns and butter workers; and the objects I have in view are to provide a simple, sanitary and inexpensive machine which can be used for churning, and in which, after the churning is completed, the butter can be quickly worked.

A further object of the invention contemplates the provision of means in the nature of specially devised mechanism whereby the rotation of the several rollers employed in connection with my invention may be operated, when occasion demands, from one and the same source of power as that employed for driving or operating the drum or cylinder within which the said paddles are arranged.

The above and additional objects are accomplished by such means as are illustrated in their preferred embodiment in the accompanying drawings, described in the following specification and then more particularly pointed out in the appended claims forming a part of this application.

In describing the invention in detail, reference will be had to the accompanying drawings, wherein like characters denote like or corresponding parts throughout the several views and in which:—

Figure 1:
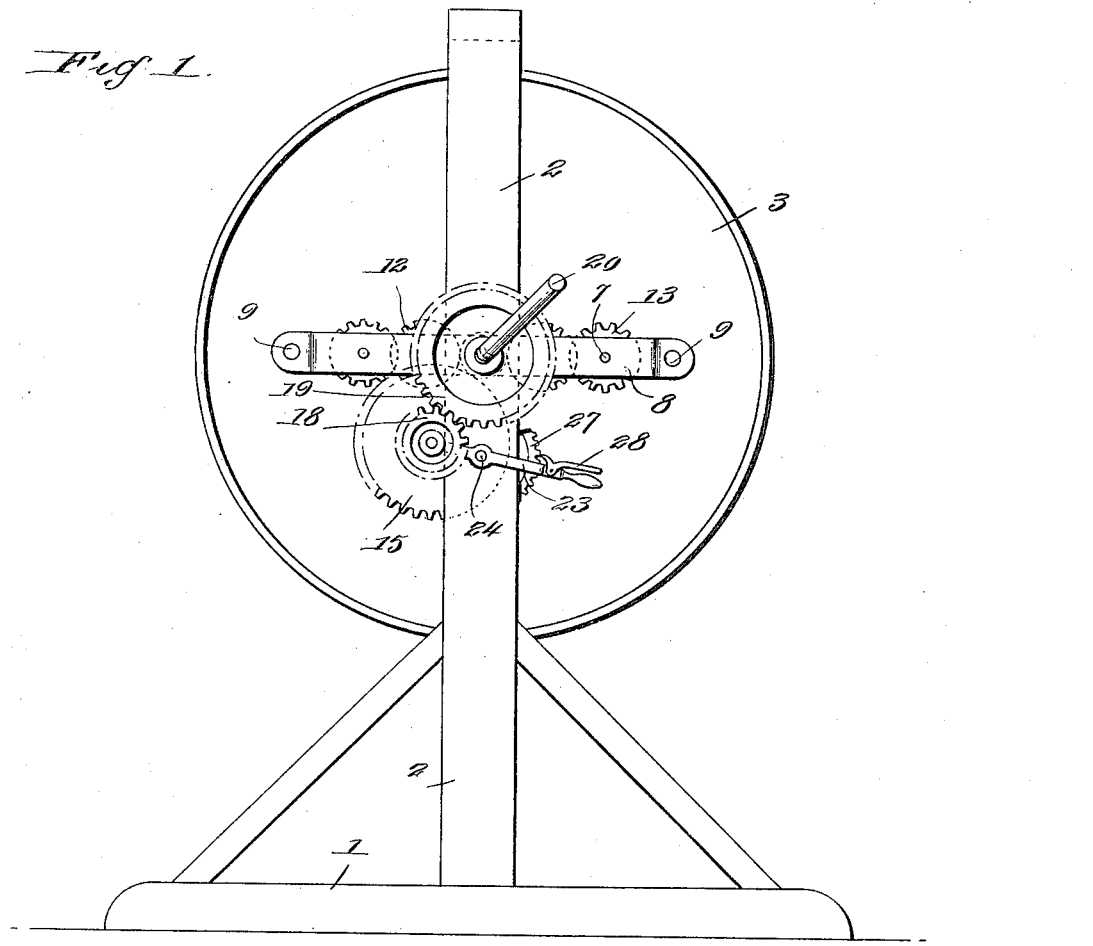
Figure 4:
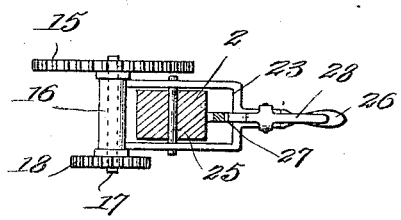

Figure 1 is an end view of a machine constructed in accordance with my invention; Fig. 2 is a longitudinal sectional view, parts being shown in elevation; Fig. 3 is a section on the line 3—3 of Fig. 2; and Fig. 4 is a top plan view of the means employed for controlling the rotation of the roller or paddle embodied in my invention.

Referring now to the drawings wherein is illustrated the preferred embodiment of my invention, the numeral 1 designates the base of a suitable upright frame 2, between the ends of which a closed-end cylinder or drum 3 forming a part of my invention is mounted for rotation. A shaft 4 extends longitudinally from one to the other of the frame uprights 2 through the said drum 3, the latter being keyed or otherwise fixedly secured thereto through the medium of a sleeve 5 extending throughout the length of the drum 3 and embracing the said shaft 4.

Rollers 6 arranged in pairs, extend longitudinally of the drum 3, the said rollers being mounted for rotation upon spindles 7 secured thereto or formed integrally therewith, the latter being journaled in the ends of the drum 3, one of the spindles of each roller projecting exteriorly thereof, the extended end of the said spindles being mounted for rotation within a suitable bracket 8 secured as at 9 to the said drum end 3 through which the spindle extends. Motion is imparted to the rollers 6 through the medium of a pinion 10 keyed or otherwise fixedly secured to a sleeve 11 loosely mounted for rotation upon the shaft 4, the said pinion meshing into gear wheels 12 which in turn mesh into similar gear wheels 13, the latter (the said gear wheels 12 and 13) being mounted upon the spindles 7, above mentioned. A second gear wheel 14 is secured to the sleeve 11 in spaced relation to the pinion 10, the said gear wheel 14 meshing into a comparatively large gear wheel 15 mounted upon a sleeve 16 disposed to embrace a shaft 17 extending parallel with the said shaft 4. A second gear wheel 18 is mounted upon the said sleeve 16, the latter meshing into a gear wheel 19 mounted upon the said shaft 4, this arrangement of the gears permitting the several rollers 6 embodied in my invention, to be rotated alternately in opposite direction during the rotation of the drum 3 within which they are disposed. A crank handle 20 is formed upon one end of the shaft 4 for imparting motion thereto, however, any other suitable means may be employed for the purpose of driving or imparting motion to the said shaft.

Paddles 21 comprising a pair of hingedly connected boards or strips 22 are arranged within the drum 3 adjacent the rollers 6, the said paddles being disposed diametrically opposite and slightly out of alinement with the said rollers. One of the said boards or strips 22 of each paddle is hingedly connected as indicated at 22' to the other of the said boards or strips, while the latter is fixedly secured as indicated at 23' to the interior wall of the drum. During a butter working operation, motion is imparted to the shaft 4 for rotating the drum 3 in one direction and driving the several rollers alternately in opposite directions, this being accomplished by the gear mechanism above described. As the drum 3 rotates, the paddles 21 open and close by reason of their hinge connection to materially assist in the said operation.

When it is desired that the rollers 6 should remain idle, that is, incapable of rotation on their own axes, and this is necessary during a churning operation, the gears 15 and 18 are thrown out of mesh with the gears 14 and 19 thereby permitting the said drum 3 to be rotated irrespective of independent rotation of the rollers 6. The means employed for shifting or throwing the said gears 15 and 18 out of mesh with the gears 14 and 19 comprises a substantially U-shaped bracket 23 pivotally connected as at 24 to one of the upright portions 2 of the frame through the medium of a pin 25 extending transversely therethrough. A handle 26 is formed upon one end of the bracket for raising and lowering the latter as occasion demands, this operation swinging the said gears out of mesh and thereby permitting the drum 3 to be rotated in the desired manner. A quadrant 27 may be secured to the upright frame portion 2 and engaged by a pivoted lever 28 carried by the bracket, 23 for locking the said bracket in adjusted position, the detail arrangement of the lever 28 and the bracket 23 being clearly illustrated in Figs. 1 and 4 of the drawings.

During a butter working operation, the rollers 6 are in motion and the butter is carried or conveyed by the paddles 21, this movement being as follows:—One of the paddles 21 first lifts or carries the butter upwardly until the said paddle, by the continued rotation of the drum, begins to descend, whereupon the butter by reason of gravity, drops or falls upon the rollers 6 and as the latter are in motion, it is thoroughly worked until finally falling onto the other or second paddle 21 where it is again conveyed upwardly in the manner above described, this operation being duplicated as often as is required.

A door 29 is hingedly secured as at 30 to the drum 3 which may be locked through the medium of suitable mechanism illustrated as at 31 in Fig. 3 of the drawings. Stops 32 are provided against which the boards 22 comprising the paddles 21 fall to prevent the same from engaging the inner periphery of the drum and at all times supporting the said boards in a manner necessary to the operation of the paddles.

It will be seen from the above, taken in connection with the accompanying drawings, that the operation of the rollers 6 is controlled by the manipulation of the handle 26, of the bracket 23; that by shifting or adjusting the said handle, the gears 15 and 16 may be thrown out of mesh with the gears 14 and 19, permitting the drum 3 to be rotated independently of the said rollers; and that the paddles 21 by reason of their disposition with respect to the rollers 6, effectually work the butter during the butter working operation in the desired manner.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent is:—

1. In a combined churn and butter worker, a rotatable drum, means rotatable within said drum, a plurality of gears operating exteriorly of the drum to rotate the means therein, a first gear engageable with one of the said plurality of gears to actuate said means, a drum shaft upon which said first mentioned gear is loosely mounted, a second gear rotatable with said first gear, a third gear upon said drum shaft, a pivoted bracket, gears mounted upon said bracket, said gears being movable into and out of mesh with said second and third gears respectively, and means operating automatically to lock the bracket in its adjusted position, as and for the purpose set forth.

2. In a combined churn and butter worker, a rotatable drum, means rotatable within the drum, a plurality of gears operating exteriorly of the drum to rotate said means therein, a first gear engageable with two of the said plurality of gears, a drum shaft upon which the said first gear is loosely mounted, said drum shaft being rotatable to actuate said drum, a second gear rotatable with said first gear, a third gear upon said drum shaft, a bracket fulcrumed to the support means for the drum, a sleeve rigid with the bracket, a shaft operating within said sleeve, gears mounted upon the respective terminals of said shaft, said gears being movable into and out of mesh with the said second and third gears respectively, and means operating automatically to lock the bracket in its adjusted position to provide for rotation of the drum simultaneously with the rotation of the means therein or independently of said means, as and for the purpose set forth.

3. In a combined churn and butter worker, the combination with a drum, and a plurality of rollers mounted therein, of a shaft upon which said drum is mounted, a sleeve upon said shaft, gears rotatable with said sleeve, a plurality of gears mounted exteriorly of the drum, certain of the said gears meshing with one of the gears rotatable with said sleeve, a pivoted bracket, a shaft carried thereby, a sleeve upon said shaft, gears upon said sleeve, a gear upon said first mentioned shaft, movement of said bracket adapted to bodily move the gears upon said last mentioned sleeve into and out of mesh with one of the gears of said first mentioned sleeve and said last mentioned gear to render the chain of gears exterior of the drum inoperative without effecting operation of the drum.

In testimony whereof I affix my signature in presence of two witnesses.

ANDERS M. KNUDSEN.

Witnesses:
 THOMAS B. ANDERSEN,
 JAMES LARSON.

Copies of this patent may be obtained for five cents each, by addressing the "Commissioner of Patents, Washington, D. C."